United States Patent [19]
Michael

[11] 3,731,706
[45] May 8, 1973

[54] VALVE WITH HYDRAULIC LOCK
[75] Inventor: Richard Arlo Michael, Waterloo, Iowa
[73] Assignee: Deere & Company, Moline, Ill.
[22] Filed: Mar. 30, 1972
[21] Appl. No.: 239,450

[52] U.S. Cl. ............... 137/624.27, 137/86, 137/495, 251/78, 251/94
[51] Int. Cl. .............................................. F16k 31/44
[58] Field of Search ........................ 137/85, 86, 464, 137/495, 624.27; 251/78, 94, 89.5

[56] References Cited
UNITED STATES PATENTS

| | | |
|---|---|---|
| 2,757,641 | 8/1956 | Meddock .................... 137/624.27 |
| 3,049,331 | 8/1962 | Quesinberry .................... 251/78 X |
| 3,137,311 | 6/1964 | Rohweder et al. .................... 137/495 |
| 3,195,574 | 7/1965 | Carls .................... 251/78 X |
| 3,339,672 | 9/1967 | Crandall .................... 137/495 X |

Primary Examiner—William R. Cline
Attorney—H. Vincent Harsha et al.

[57] ABSTRACT

A modulating valve is urged from its extreme closed position to its extreme open position by one end of a pivoted lever, and the modulating pressure is applied to a piston which acts on the other end of the pivoted lever to lock the modulating valve in its extreme open position until an external force is applied to the lever to move the modulating valve to its extreme closed position.

6 Claims, 3 Drawing Figures

Patented May 8, 1973

3,731,706

VALVE WITH HYDRAULIC LOCK

BACKGROUND OF THE INVENTION

The present invention relates generally to hydraulic valves, and more specifically relates to a hydraulic lock for a modulating valve which is particularly useful for controlling a normally disengaged clutch.

When applying a normally disengaged clutch, such as a power take-off clutch, the operator should have a feel of the force applied to the clutch so that he can smoothly engage the clutch. If the clutch is hydraulically actuated, the required feel or feedback is provided by a modulating valve. It is also necessary with a normally disengaged clutch to provide some means to lock the clutch in the engaged condition. Over center linkage systems have been used unsuccessfully because a large amount of the alloted lever travel is used to move the linkage over center and this results in short lever travel for engagement and a very sensitive clutch. Detent and cam systems have also been used to increase lever travel, but a significant amount of the total lever travel was still required to detent or go over center on the cam and the lever travel available for clutch engagement was insufficient to lower the sensitivity of the clutch to an acceptable level.

SUMMARY OF THE INVENTION

The principal object of the present invention is to provide a valve particularly useful for clutch control and which has a hydraulic lock for locking the valve in its extreme open position and which uses very little of the control lever travel to apply the lock.

A more specific object of the present invention is to provide a modulating valve which is urged from its extreme closed position to its extreme open position by a pivoted lever and in which the modulating pressure is applied to a piston which acts on the pivoted lever to retain the modulating valve in its extreme open position until moved to its extreme closed position by an external force.

The above objects and additional objects and advantages of the present invention will become apparent to those skilled in the arts from a reading of the following detailed description when taken in conjunction with the accompanying drawing.

DESCRIPTION OF THE PREFERRED EMBODIMENT

Figure 1:
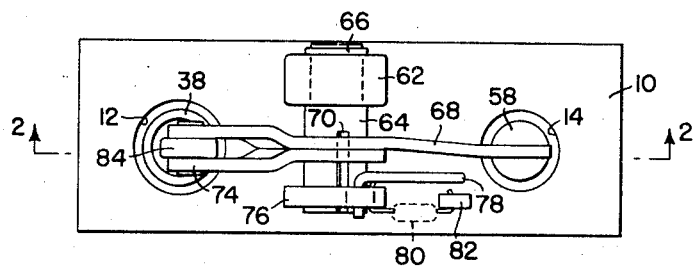
FIG. 1 is a top plan view of a valve according to the present invention.

With reference to the drawing, the valve according to the present invention includes a valve body 10 having a pair of spaced generally parallel bores 12 and 14, each of which is closed at one end and open at the other. The bore 12 is provided with six spaced annular grooves 16, 18, 20, 22, 24 and 26. The groove 16 is in communication with an inlet port 28 which will be connected with a source of fluid pressure or pump (not shown), and the groove 18 is in fluid communication with a port 30 which will be connected with a hydraulic clutch actuator (not shown). The grooves 20 and 22 are both in communication with ports (not shown) which lead to a fluid reservoir or sump. The groove 24 is in communication with a fluid passage 32 which leads to the closed end of the valve bore 14. The groove 26 is in communication with a port 34 which is interconnected with the port 30 by a fluid passage 36.

A valve spool 38 is slidably disposed within the valve bore 12, and includes first and second lands 40 and 42 separated by a groove 44, a third land 46 separated from the land 42 by a groove 48, and a fourth land 50 separated from the land 46 by a groove 52.

Figures 2, 3:
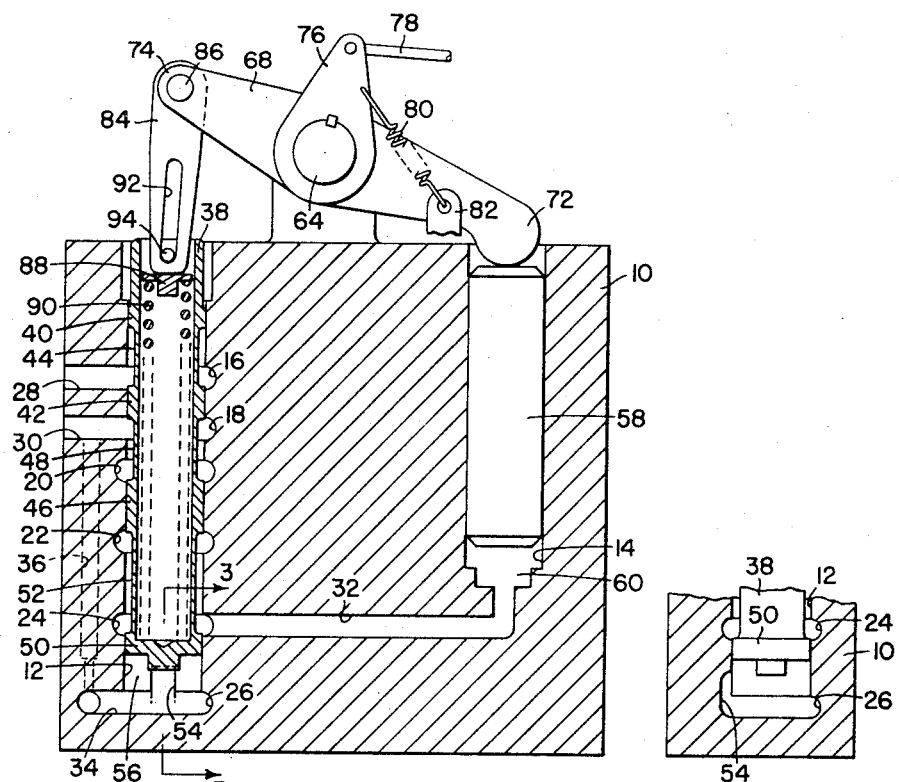
FIG. 2 is a sectional view taken substantially along the line 2—2 of FIG. 1; and, FIG. 3 is a sectional view taken substantially along the line 3—3 of FIG. 2.

The valve spool 38 is movable between an extreme closed position illustrated in FIG. 2 and an extreme open position. In the extreme closed position, the land 42 blocks fluid communication between the grooves 16 and 18, the groove 48 provides fluid communication between the grooves 18 and 20, and the groove 52 provides fluid communication between the grooves 22 and 24. In the extreme open position, the groove 44 provides fluid communication between the grooves 16 and 18, the land 42 blocks fluid communication between the grooves 18 and 20, the land 46 blocks fluid communication between the grooves 22 and 24, and the groove 52 provides fluid communication between the groove 24 and a slot 54 which is in communication with groove 26 at the closed end of the valve bore 12.

The land 50, in combination with the closed end of the valve bore 12 provides a pressure chamber 56.

A piston 58 is slidably mounted in the valve bore 14 and its inner end forms, in combination with the closed end of the valve bore 14, a pressure chamber 60.

A lug 62 on the valve housing 60 is provided with an aperture which receives the reduced end portion of a pivot shaft 64. The pivot shaft 64 is retained in the aperture provided in the lug 62 by a snap ring 66. A lever 68 is mounted on the pivot shaft 64 and is secured thereto by a key 70. The lever 68 has one end 72 in engagement with the piston 58 and a bifurcated end 74 overlying the open end of the valve bore 12.

A control arm 76 is mounted on the pivot shaft 64 and is secured thereto by the key 70. A control rod 78 is connected to the outer end of the control arm 76 and connects the control arm 76 with a manual control lever (not shown). The control arm 76 and control rod 78 are only exemplary of the numerous possibilities for remote control of the lever 68. A light spring 80 is connected between the control arm 76 and a lug 82 on the front of the valve body to urge the lever 68 in a clockwise direction as viewed in FIG. 2. The location of spring 80 is completely optional as long as it provides a light force on the lever 68 to urge the lever 68 in a clockwise direction. For example, the spring 80 could act on the rod 78 or the unshown control lever.

A link 84 is pivotally connected between the bifurcated end 74 of the lever 68 by a pin 86 and extends downwardly into the hollow valve spool 38 where it engages a cap 88 on the end of a modulating spring 90 which acts between the cap 88 and the inner end of the valve spool. The link 84 is provided an elongated slot 92 which is generally aligned with the valve spool and receives a pin 94 carried by the valve spool 38. The slot 92 and pin 94 provide a lost-motion connection between the lever 68 and valve spool 38.

The operation of the valve is as follows. When the valve spool 38 is in its closed position as illustrated in FIG. 2, the port 28 and groove 16 are pressurized at some constant pressure, for example, 150 psi. The hydraulic clutch actuator port 30 is connected to sump through grooves 18, 48 and 20, the pressure chamber 56 is connected to sump through port 34, fluid passage 36, port 30 and grooves 18, 48 and 20. The pressure chamber 60 is also connected to sump through the fluid passage 32 and grooves 24, 52 and 22.

As the lever 68 is moved in a counterclockwise direction or toward the engaged position by a force applied to the unshown manual control lever, the link 84 and valve spool 38 move downwardly until communication is established between the ports 28 and 30 by the groove 44. The pressure in port 30 is also transferred through the passage 36 and port 34 to the pressure chamber 56. When the pressure in chamber 56 is sufficient to compress the spring 90, the valve spool 38 will move upwardly so that the land 42 again blocks fluid communication between the ports 28 and 30. Additional counterclockwise movement of the lever 68 will increase the pressure in the hydraulic clutch actuator in a similar manner as the valve spool 38 regulates the flow of fluid to balance the hydraulic force in the pressure chamber 56 against the force of the spring 90. As the lever 68 continues to move in the counterclockwise direction, the clutch pressure will rise until the pin 94 contacts the upper edge of the slot 92 at which time the valve spool 38 is positively moved downwardly to provide increased communication between the ports 28 and 30 through the slot 44.

As the valve spool 38 approaches its extreme open position, the land 50 moves over the slot 54 so that fluid communication is established between the pressure chamber 54 and groove 24 which is blocked from communication with the groove 22 by the land 46. The pressure in groove 24 is transferred through the fluid passage 32 to the pressure chamber 60 and the pressure in chamber 60 acts through the piston 58 which is positioned a greater distance from the axis of the pivot shaft 64 than is the valve spool 38, the lever 68, link 84 and pin 94 to retain the valve spool 38 in its extreme open position until an external force is applied to the lever.

If an external force is applied to the lever 68 to move the lever 68 in a clockwise direction or toward a disengaged position, the valve spool 38 returns to its extreme closed position. This relieves the pressure from the hydraulic clutch actuator so that the clutch is disengaged and from the pressure chambers 56 and 60 so that the piston 68 will no longer exert a force on the lever 68 and the light spring 80, acting through the control arm 76, lever 68, link 84 and pin 94, will retain the valve spool 38 in its extreme closed position.

If there should be a pressure failure while the valve spool 38 is in its extreme open position, the pressure drop will be felt in the pressure chamber 60 to remove the force applied to the lever 68 by the piston 58 so that the spring 80 can return the valve spool 38 to its extreme closed position. This provides a definite safety advantage. For example, if the valve is used to control a clutch on a vehicle, for example a power take-off clutch, and the operator turns off the engine without disengaging the clutch, the pressure will drop and the spring 80 returns the valve 38 to its extreme closed position so that the clutch will be disengaged when the operator again starts the vehicle.

From the foregoing description, it can be seen that the valve and hydraulic lock according to the present invention utilizes the maximum amount of control lever travel for clutch engagement to reduce the sensitivity of the clutch and provides a pressure feedback or feel so that the operator can smoothly engage the clutch.

Having described a preferred embodiment of the invention, various modifications within the spirit and scope of the invention will become apparent to those skilled in the art and can be made without departing from the underlying principles of the invention. Therefore, the invention should not be limited by the specific illustration and description, but only by the fair scope of the following claims.

I claim:

1. A manually adjustable valve for modulating hydraulic pressure between a hydraulic pressure source and a hydraulic actuator, comprising: a valve body having a pair of spaced, generally parallel bores with each bore having an open end and a closed end; lever means pivotally mounted on the valve body intermediate its ends between the bores with its two ends generally overlying the open ends of the bores; a piston slidably mounted in one bore and having one end forming a first pressure chamber with the closed end of the one bore and a second end disposed to act on an end of the lever means; a valve spool slidably disposed in the other bore and having one end forming a second pressure chamber with the closed end of the other bore; a pressure inlet port and an actuator outlet port communicating with the other valve bore; means establishing fluid communication between the actuator outlet port and the second pressure chamber; means establishing fluid communication between the first pressure chamber and a third port communicating with the other bore; the valve spool having a first extreme position in one direction in which it establishes fluid communication between the pressure inlet and actuator outlet ports and between the second pressure chamber and the third port and a second extreme position in which it blocks fluid communication between the pressure inlet and actuator outlet ports and between the second pressure chamber and the third port; a modulating spring disposed to act between the valve spool and an end of the lever means to urge the valve spool toward its first extreme position with a force dependent on the position of the lever means; and manually adjustable means to move the lever means about its pivot in either direction, whereby, when the valve spool has been moved to its first extreme position the pressure in the first pressure chamber will act through the piston, lever means and spring to retain the valve spool in its first extreme position.

2. A valve as set forth in claim 1 wherein means independent of the modulating spring provides a lost-motion connection between the valve spool and lever means and acts to positively move the valve spool to both its extreme positions in response to movement of the lever means.

3. A valve as set forth in claim 2 wherein spring means normally urge the lever means in a direction to decrease the force urging the valve spool to its first extreme position, whereby, when the valve spool has been moved to its second extreme position, the spring means will retain the valve spool in its second extreme position.

4. A valve as set forth in claim 1 wherein a bore is provided in the valve spool and is open in the same direction as the bores provided in the valve body, the modulating spring is disposed within the valve spool bore, a link member has one end pivotally connected to an end of the lever and a second end extending into the valve spool bore to act on the modulating spring, the link member is provided with an elongated slot generally aligned with the valve spool bore; and pin means carried by the valve spool extends through the slot to provide a lost-motion connection between the lever means and valve spool whereby the lever means will positively move the valve spool to its second extreme position and, after the modulating spring has been compressed a predetermined amount, will positively move the valve spool to its first extreme position.

5. A valve as set forth in claim 1 wherein the pivotal mounting of the lever means is closer to the other bore than the first bore whereby the piston can provide a greater torque through the lever than can the valve spool.

6. A valve as set forth in claim 5 wherein spring means urges the lever means in a direction to decrease the force urging the valve spool to its first extreme position whereby, when the valve spool has been moved to its second extreme position, the spring means acting through the lever means will return the valve spool in its second extreme position.

* * * * *